Sept. 25, 1934.  H. F. PARKER  1,974,583
BRAKE

Original Filed May 17, 1930

INVENTOR.
HUMPHREY F. PARKER
BY
ATTORNEY

Patented Sept. 25, 1934

1,974,583

UNITED STATES PATENT OFFICE 1,974,583

BRAKE

Humphrey F. Parker, New York, N. Y., assignor to Bendix Aviation Corporation, South Bend, Ind., a corporation of Delaware Original application May 17, 1930, Serial No. 453,387. Divided and this application February 18, 1933, Serial No. 657,431

10 Claims. (Cl. 188—79.5)

This invention relates to brakes, and is illustrated as embodied in an internal expanding brake of the shiftable anchorage type having a novel adjustment to compensate for wear.

An object of the invention is to provide a simple and easily-manipulated adjustment, and especially one which can be used as a floating articulation or thrust link adjustably connecting a pair of floating shoes. Preferably the shoes have pivoted thereto parts, such as flat plates or links, which extend side by side and are arranged to be forced in opposite directions for purposes of adjustment. In one desirable arrangement a device, such as a wedge, for making the adjustment is mounted on and carried by the links, the whole forming in effect a rigid but adjustable thrust device subassembly connecting the shoes.

Various features also relate to the construction and relative arrangement of the parts of this novel subassembly, and to certain desirable specific structures, and will be apparent from the following description of the embodiment shown in the accompanying drawing, in which.

Figure 1:
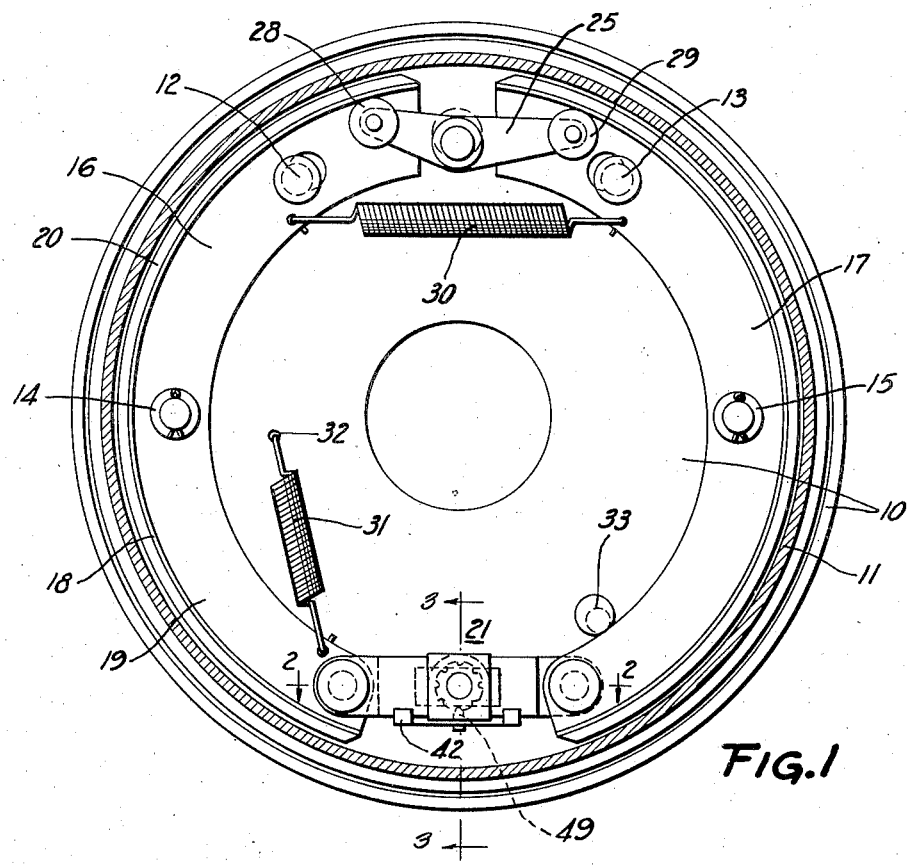
Figure 1 is a vertical section through the brake, just inside the head of the brake drum, and showing the brake shoes in side elevation.

The brake selected for illustration includes a backing plate 10 and a rotatable drum 11, cooperating to form a substantially closed brake chamber containing the brake proper. The backing plate carries a pair of posts or anchors 12 and 13, and suitable steady rests 14 and 15, for a pair of shoes or equivalent friction devices 16 and 17.

The illustrated shoes are T-shaped in cross-section, each being made up of a rim 18 and a web 19, the rim 18 carrying riveted thereto the usual brake lining 20. The shoes are adjustably connected by a novel thrust device 21 further described below. The brake is shown as applied by a device 25, eccentrically mounted on the usual camshaft, and having rollers 28 and 29 in radial thrust engagement with the inner faces of the rims of the two shoes.

Return springs 30 and 31 are provided, the former being connected between the shoes and the latter connected at one end to the lower end of shoe 16 and at its upper end at 32 to the backing plate. Spring 31 is inclined, so that when the brake is in released position it holds the web of shoe 17 against an adjustable eccentric stop 33 carried by the backing plate.

When the brake is applied, if the drum is turning clockwise the shoe 16 anchors on the post 12, whereas if the drum is turning counterclockwise the shoe 17 anchors on the post 13. The webs of the shoes are formed with elongated slots encircling the anchors 12 and 13, to permit the unanchored shoe to move away from its anchor to transmit its torque through the connecting device 21 to the anchored shoe.

Figure 2:
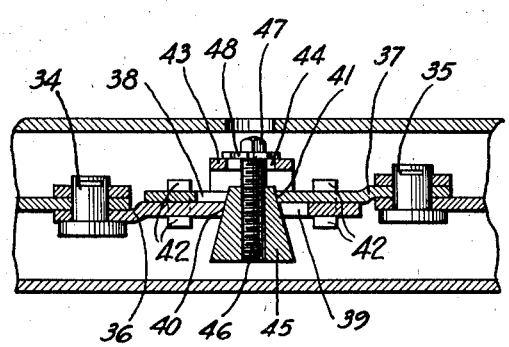
Figure 2 is a partial section through the adjustment, on the line 2—2 of Figure 1.
Figure 3:
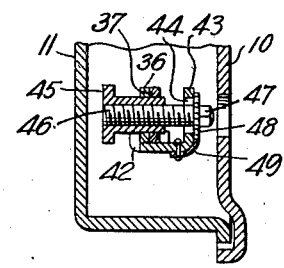
Figure 3 is a partial section through the adjustment on the line 3—3 of Figure 1.

The structure of the novel device 21, to which the present invention mainly relates, is shown in detail in Figure 2. The device, in the embodiment shown in that figure, comprises plates or links 36 and 37 movably connected respectively to the lower ends of the webs of shoes 16 and 17 by means such as pivots 34 and 35. These plates are formed with elongated rectangular horizontal slots 38 and 39, formed with inclined wedge surfaces 40 and 41 at the end of each slot nearest its shoe.

A stamping 43, or other support for an adjusting member, is arranged beside the two plates, on the side next the backing plate, with its lower portion bent outwardly and formed with tongues 42 slidably embracing the lower edges of the plates. This stamping is formed with an opening 44, opposite which is arranged an adjusting wedge seated in the slots 38 and 39 with its opposite sides engaging the wedge surfaces 40 and 41. An adjusting bolt 46 passes through the opening 44 and is threaded into the wedge 45, being formed for convenience of manipulation with a squared head or the like 47 opposite an opening in the backing plate.

The adjusting member 46 has pressed or otherwise mounted thereon, or formed integrally therewith if preferred, a collar 48 having a ratchet or toothed edge adapted for yielding locking engagement with a pawl or tooth 49 shown in dotted lines in Figure 1 and which may be a tongue struck out from or secured to the stamping 43. This pawl can yield when the bolt 45 is turned by a wrench or the like, but normally holds the bolt locked. The collar also serves as an abutment engaging the stamping 43 and taking the thrust of the adjusting bolt 46.

It will be seen that turning the bolt 46 moves the wedge 45 laterally, transversely of the plane of the brake, to wedge the lower ends of the shoes apart to adjust the brake for wear, but that the entire device 21 forms a rigid floating connecting link pivotally connected at its ends to the shoes.

While one illustrative embodiment has been described in detail, it is not my intention to limit the scope of the invention to that particular embodiment, or otherwise than by the terms of the appended claims. The present application is a division of my application No. 453,387, filed May 17, 1930.

I claim:

1. A brake comprising friction elements, an adjustable member for the friction elements including relatively adjustable overlapping plates respectively secured to the friction elements, and held side by side to form a single rigid thrust link in the normal operation of the brakes, means cooperating with the plates for adjusting the plates with respect to each other and means connected therewith accessible from outside of the brake for effecting the adjustment thereof.

2. A brake comprising at least two friction elements, a member connecting the articulating ends of the friction members including corresponding overlapping plates pivotally secured to the respective ends of the friction elements, means holding said plates together in the normal operation of the brake to form a single rigid thrust unit, means cooperating with the plates for effecting a relative adjustment thereof, including a wedged shaped member adjustable from the outside of the brake.

3. A brake adjustment comprising plates arranged beside each other and formed with registering openings, a wedge arranged in said openings, and movable through the openings transversely of the planes of said plates, a stamping beside the plates having portions movably embracing the edges of the plates, and an adjusting member movably carried by said stamping and operatively engaging the wedge.

4. A brake adjustment comprising plates arranged beside each other and formed with registering openings, a wedge arranged in said openings, and movable through the openings transversely of the planes of said plates, a stamping beside the plates having portions movably embracing the edges of the plates, and an adjusting bolt having its thrust taken by said stamping and threaded into the wedge.

5. A brake adjustment comprising plates arranged beside each other and formed with registering openings, a wedge arranged in said openings, and movable through the openings transversely of the planes of said plates, a stamping beside the plates having portions movably embracing the edges of the plates, and an adjusting member movably carried by said stamping and operatively engaging the wedge, said stamping and said adjusting member having interlocking parts.

6. A brake adjustment comprising plates arranged beside each other and formed with registering openings, a wedge arranged in said openings, a stamping beside the plates having portions movably embracing the edges of the plates, and an adjusting member movably carried by said stamping and operatively engaging the wedge, said stamping and said adjusting member having respectively a locking pawl and a locking collar in operative interlocking engagement.

7. A brake adjustment comprising plates arranged beside each other and formed with registering openings, a wedge arranged in said openings, a stamping beside the plates having portions movably embracing the edges of the plates, and an adjusting member movably carried by said stamping and operatively engaging the wedge, said stamping and said adjusting member having respectively a locking pawl and a locking collar in operative interlocking engagement, said collar engaging the stamping and transmitting the thrust of the adjusting member thereto.

8. A brake adjustment comprising plates arranged beside each other and formed with registering openings, a wedge arranged in said openings, and movable through the openings transversely of the planes of said plates, a support beside the plates having portions movably embracing the edges of the plates, and an adjusting member movably carried by said support and operatively engaging the wedge.

9. A brake adjustment comprising plates arranged beside each other and formed with registering openings, a wedge arranged in said openings, and movable through the openings transversely of the planes of said plates, a support beside the plates having portions movably embracing the edges of the plates, and an adjusting member movably carried by said support and operatively engaging the wedge, said support and said adjusting member having interlocking parts.

10. A brake adjustment comprising plates arranged beside each other and formed with registering openings, a wedge arranged in said openings, a support beside the plates having portions movably embracing the edges of the plates, and an adjusting member movably carried by said support and operatively engaging the wedge, said support and said adjusting member having respectively a locking pawl and a locking collar in operative interlocking engagement, said collar engaging the support and transmitting the thrust of the adjustment member thereto.

HUMPHREY F. PARKER.